May 30, 1939.  E. N. HURLBURT  2,160,404
ELECTRIC CONTACT THERMOMETER
Filed Aug. 25, 1937
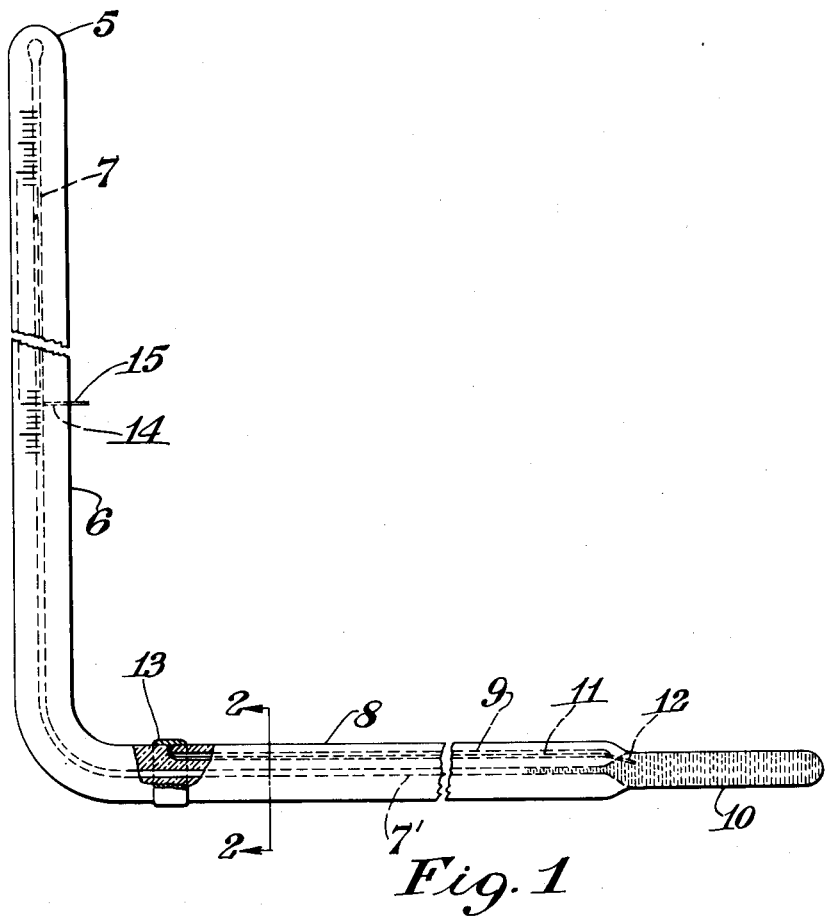
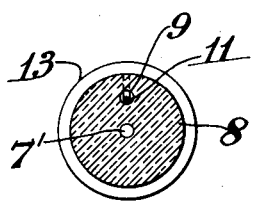
INVENTOR.
EDWARD N. HURLBURT
BY
D. Clyde Jones
ATTORNEY.

Patented May 30, 1939

2,160,404

UNITED STATES PATENT OFFICE 2,160,404

ELECTRIC CONTACT THERMOMETER

Edward N. Hurlburt, Rochester, N. Y., assignor to Taylor Instrument Companies, Rochester, N. Y., a corporation of New York Application August 25, 1937, Serial No. 160,847

1 Claim. (Cl. 200—141)

This invention relates to thermometers and more particularly to electric contact thermometers of the glass type.

In the past it has been the practice to seal contacts at predetermined points in the tube of a glass thermometer so that they project into the tube bore whereby the mercury column on rising therein engages the contacts to complete various circuits to operate alarms and the like. However, such electric contact thermometers have been open to the objection that when the mercury column accidentally becomes separated or discontinuous the thermometer fails to effect proper electrical operation.

In accordance with the main feature of the present invention, the contacts are so positioned in an electric contact glass thermometer that the electrical control or alarm circuit will not be completed if the mercury column separates.

A further feature of the invention relates to mounting one of the contacts of an electric contact thermometer so that it projects into the mercury or indicating liquid in the bulb of the thermometer and to mounting another contact so that it projects into the bore of the glass capillary tube of the thermometer at a predetermined point where a circuit is to become effective. By this arrangement the mercury or other indicating liquid column must be unbroken before the circuit can be completed.

Another feature of the invention relates to sealing an internal contact of an electric contact thermometer through the wall of the bulb of the thermometer and into the mercury therein, the internal contact being connected to an external contact on an intermediate portion of the thermometer stem by a wire extending through a separate bore in a glass tube section forming a part of the stem whereby the wire and the internal contact are electrically insulated from material surrounding this tube section and bulb.

For a clear understanding of the invention reference is made to the drawing in which Fig. 1 is a side elevation of the thermometer of this invention with a portion thereof broken away, and Fig. 2 is a cross section on the line 2—2 of Fig. 1.

In Fig. 1, a fragment of which is broken away for clearness in disclosure, there is illustrated a glass thermometer of the angle type, although the invention is equally applicable to a straight stem thermometer. This thermometer comprises a glass capillary tube scale section 6 having the upper end of its bore 7 closed or sealed as indicated at 5. This section 6 which is the graduated or indicating portion of the thermometer, is fused to a second glass tube stem section 8. The stem section 8 is provided with two separate bores 7' and 9, and the bore 7' comunicating with the bore 7 in the section 6. The other end of the section 8 is joined to and its bore 7' communicates with the interior of a hollow glass bulb 10 adapted to contain mercury or the like. It will be understood that the bore 9 encloses a wire conductor 11 which is of smaller diameter than said bore to pass therethrough freely. The wire conductor has its terminal or contact 12 projecting into the mercury in the bulb 10. The end of the bore 9 at the bulb is sealed and the electrode 12 extends through the seal. The joint between the other end of the tube section 8 and the tube section 6 serves to seal the other end of the bore 9, the wire being extended through this seal where it makes external electrical contact with a copper band 13 electroplated or otherwise attached around the glass thermometer stem. At a predetermined point on the indicating section 6 of the thermometer stem, there is fused into the glass tube a contact 14 which extends into the bore 7 of the thermometer stem and which is electrically connected to an external contact 15. Thus when the mercury column rises until it engages the contact 14, an alarm or other circuit connected to its terminals 13 and 15 is completed. By this arrangement if any break exists in the mercury column between the bulb 10 and the contact 14, the circuit will be incomplete. In this construction, a circuit extends entirely through the glass tube section 8 and thus neither the wire nor the internal contact 12 can be short circuited or grounded by the well or other support on which the thermometer stem may be mounted. Furthermore, the cross section of stem section 8 is such that it can readily be mounted in standard fittings

I claim:

An electric contact thermometer comprising a glass bulb, a glass connecting-tube section having one end fused to said bulb, said section having two parallel bores extending longitudinally therethrough, the first of said bores being sealed at both ends of said tube section and the second of said bores communicating with the interior of said bulb, a graduated indicating glass tube section having a capillary bore extending longitudinally therethrough, one end of said indicating tube section being sealed and the other end thereof being fused to the free end of said connecting tube section with said second bore thereof communicating with the bore of the indicating tube section, an electrically conducting wire extending through said first bore of said connecting tube section and having its end portions sealed into the sealed ends of said bore, said wire being of smaller diameter than that of said first bore to press freely therethrough, one end of said wire projecting into the interior of said bulb, the other end of said wire projecting externally of said section, an electrical contact approximately at the junction of said sections, said contact being connected to the externally projecting end of said wire, a second contact sealed into the glass of the indicating tube section and projecting into the bore thereof, and a thermo-sensitive electrically conducting liquid in said bulb and the second bore of said connecting tube section as well as in a portion of the bore of the indicating tube section.

EDWARD N. HURLBURT.